United States Patent [19]
Jimarez et al.

[11] Patent Number: 5,909,838
[45] Date of Patent: Jun. 8, 1999

[54] METHOD OF SOLDER REMOVAL

[76] Inventors: Lisa Jeanine Jimarez; Miguel Angel Jimarez, both of 119 Main St., Newark Valley, N.Y. 13811

[21] Appl. No.: 08/964,291

[22] Filed: Nov. 4, 1997

[51] Int. Cl.$^6$ .................................................. B23K 1/018
[52] U.S. Cl. .............................. 228/125; 228/19; 228/264
[58] Field of Search ............................... 228/264, 19, 125

[56] References Cited

U.S. PATENT DOCUMENTS

| | | | |
|---|---|---|---|
| 3,970,234 | 7/1976 | Litt et al. ................................. | 228/20 |
| 4,164,606 | 8/1979 | Spirig ...................................... | 428/605 |
| 4,323,631 | 4/1982 | Spirig ...................................... | 428/605 |
| 4,416,408 | 11/1983 | Spirig ...................................... | 228/19 |
| 5,065,931 | 11/1991 | Liu et al. ................................. | 228/19 |
| 5,072,873 | 12/1991 | Liu et al. ................................. | 228/264 |
| 5,072,874 | 12/1991 | Bertram et al. ......................... | 228/264 |
| 5,083,698 | 1/1992 | Forsha ...................................... | 228/264 |
| 5,219,520 | 6/1993 | Brofman et al. ........................ | 419/35 |
| 5,284,286 | 2/1994 | Brofman et al. ........................ | 228/19 |
| 5,458,281 | 10/1995 | Downing et al. ....................... | 228/264 |
| 5,620,132 | 4/1997 | Downing et al. ....................... | 228/264 |

FOREIGN PATENT DOCUMENTS

| | | |
|---|---|---|
| 1-192466 | 2/1989 | Japan . |

OTHER PUBLICATIONS

IBM Technical Disclosure Bulletin vol. 12, No. 4, Sep. 1969, p. 548, "Tinning Closely Spaced Leads".

IBM Technical Disclosure Bulletin vol. 18, No. 5, Oct. 1975, pp. 1384–1385, "Cleaning of Solder Pads Prior to a Rework Operation".

IBM Technical Disclosure Bulletin vol. 21, No. 11, Apr. 1979, p. 4482, "Desoldering Unit".

IBM Technical Disclosure Bulletin vol. 24. No. 7A, Dec. 1981, p. 3481, "Use of a Tinned Copper Slug for Module Reworking".

IBM Technical Disclosure Bulletin vol. 25, No. 5, Oct. 1982, p. 2285, "Method for Manufacturing Porous Metal Devices".

IBM Technical Disclosure Bulletin vol. 27, No. 10B, Mar. 1985, pp. 6344–6345, "Chip Rework on Multilayer Ceramic Recess".

IBM Technical Disclosure Bulletin vol. 34, No. 3, Aug. 1991, pp. 52–53, "Small Copper Block Application for Solder Bump Joined Chip Replacement".

IBM Technical Disclosure Bulletin vol. 37, No. 5, May 1994, p. 35, "Copper Blocks for Chip Site Dress".

*Primary Examiner*—Patrick Ryan
*Assistant Examiner*—Jeffrey T. Knapp
*Attorney, Agent, or Firm*—John R. Pivnichny

[57] ABSTRACT

Excess solder is removed from an article such as a circuit substrate or electronic component as is often required after separation of a mounted component from a substrate. A metal foil having a surface with micro-roughness is brought in contact with the solder material and heated to thereby melt the solder, allowing it to flow onto the foil surface. The foil, having the molten solder therein, is then withdrawn.

22 Claims, 3 Drawing Sheets

METHOD OF SOLDER REMOVAL

TECHNICAL FIELD

The invention relates to methods and structures for removing solder from a substrate or component including a semiconductor chip as part thereof.

BACKGROUND OF THE INVENTION

Removal of solder from a substrate or component is a necessary process that is widely practiced for the repair or rework of electronic assemblies. Electronic components, whether of the surface mount or pin through hole type are usually joined to a supporting substrate with solder joints between individual tabs or pins on the component and corresponding surface pads or holes surrounded by pads on the substrate. When a component or chip is removed from a substrate due to some known or suspected defect in the component or attachment, an excess of solder of random or irregular shape often having a rough surface is left behind on the substrate component attachment pads. Such surfaces are unsuitable for attaching another component or re-attaching the same component without first removing the excess solder to provide a uniform surface on the attachment pads. Components including semiconductor chips may also have excess solder which needs to be removed prior to use or re-use.

Various methods have been developed for removing solder from a substrate or component. For example, vacuum suction has been used to achieve solder removal using apparatus such as disclosed in U.S. Pat. No. 3,970,234. Use of vacuum suction apparatus is undesirable because it is complicated to make and use, and the results are highly dependent on operator skill. Furthermore, due to clogging with solder, vacuum suction tips can not be made smaller than about 10 mili-inches in diameter, preventing their use on chip sites and other fine pitch arrays of solder pads.

Another method for solder removal involves apparatus to heat the solder above its melting point and then using a wick to draw the molten solder from the surface of the substrate or component.

Accordingly, a great variety of wicks have been developed. For example, strands of copper coated with solder and braided together to form a wick are disclosed in U.S. Pat. No. 4,164,606 while U.S. Pat. No. 4,416,408 describes a wick made from an open mesh of strands. A wick made of a non-metallic material coated with metal and flux is disclosed in U.S. Pat. No. 4,323,631.

A wick formed by etching a pattern in a silicon base and then metallizing the pattern is described in U.S. Pat. No. 5,065,931. Japanese Patent No. 1-192466 uses a printed circuit board having holes which absorb melted solder by a capillary phenomenon into the holes. Browne and DiNunzio describe using a copper block with cone shaped aligned protrusions to wick solder up into the copper block in IBM Technical Disclosure Bulletin Vol. 27, No. 5, May 1994 p. 35. Caccoma et. al. describe a solder wick ribbon apparatus for solder removal in IBM Technical Disclosure Bulletin Vol. 21, No. 11, April 1979, p. 4482.

Porus metal blocks have also been used for absorbing solder. Methods for making such devices are described in IBM Technical Disclosure Bulletin Vol. 25, No. 5, October 1982, p. 2285 and in U.S. Pat. No. 5,219,520. Once a block becomes filled with solder it must be replaced, making this approach undesirable because the blocks are expensive to manufacture.

Solder material has also been removed by using a jet of hot oil as described in IBM Technical Disclosure Bulletin, Vol. 12, No. 4, September 1968, p. 548 or a stream of hot gas to dislodge excess solder making it part of the jet stream as disclosed in IBM Technical Disclosure Bulletin, Vol. 18, No. 5, October 1975, P. 1384–85. Fluid impingement methods such as these can result in solder residue becoming embedded in the substrate surface due to the high velocity of the stream.

The substrate can be partially or completely immersed in a liquid bath of solder as in IBM Technical Disclosure Bulletin, Vol. 19, No. 7, December 1976, p. 2476 or another fluid as in U.S. Pat. No. 5,620,132. With immersion, solder removal can be enhanced by passing a squeegee over the surface of the substrate after the solder has become melted, or by using an adhesive material to pull the solder away from the substrate after it is raised to its melting point as in U.S. Pat. No. 5,458,281. Immersion methods necessarily require apparatus for containing and heating the fluid and means for removing solder from the container as it accumulates or else periodically replacing the fluid.

OBJECTS AND SUMMARY OF THE INVENTION

It is therefore a principal object of the present invention to enhance the art of solder removal from substrates and components by providing an improved method for achieving the necessary results.

It is another object to provide a structure for performing the improved solder removal method.

It is yet another object to provide a method for solder removal using readily available and inexpensive materials.

These and other objects are attained in accordance with one embodiment of the invention wherein there is provided a process for removing solder material from an article comprising the steps of positioning a metal foil having a surface with micro-roughness adjacent solder material on an article, applying heat to the metal foil to substantially melt at least some of the solder material allowing at least some of the solder material to be drawn onto the surface of the metal foil, and withdrawing the metal foil in a direction away from the article thereby removing some of the solder material from the article.

In accordance with another embodiment of the invention there is provided a structure for removing solder material from an article comprising means for positioning a metal foil having a surface with micro-roughness adjacent solder material on an article, and means for heating the metal foil to a temperature sufficient to melt at least some of the solder material such that at least some of the solder material is drawn onto the surface having the micro roughness.

DETAILED DESCRIPTION OF THE INVENTION

For a better understanding of the present invention, together with other and further objects, advantages, and capabilities thereof, reference is made to the following disclosure and the appended claims in connection with the above-described drawings.

Figure 1:
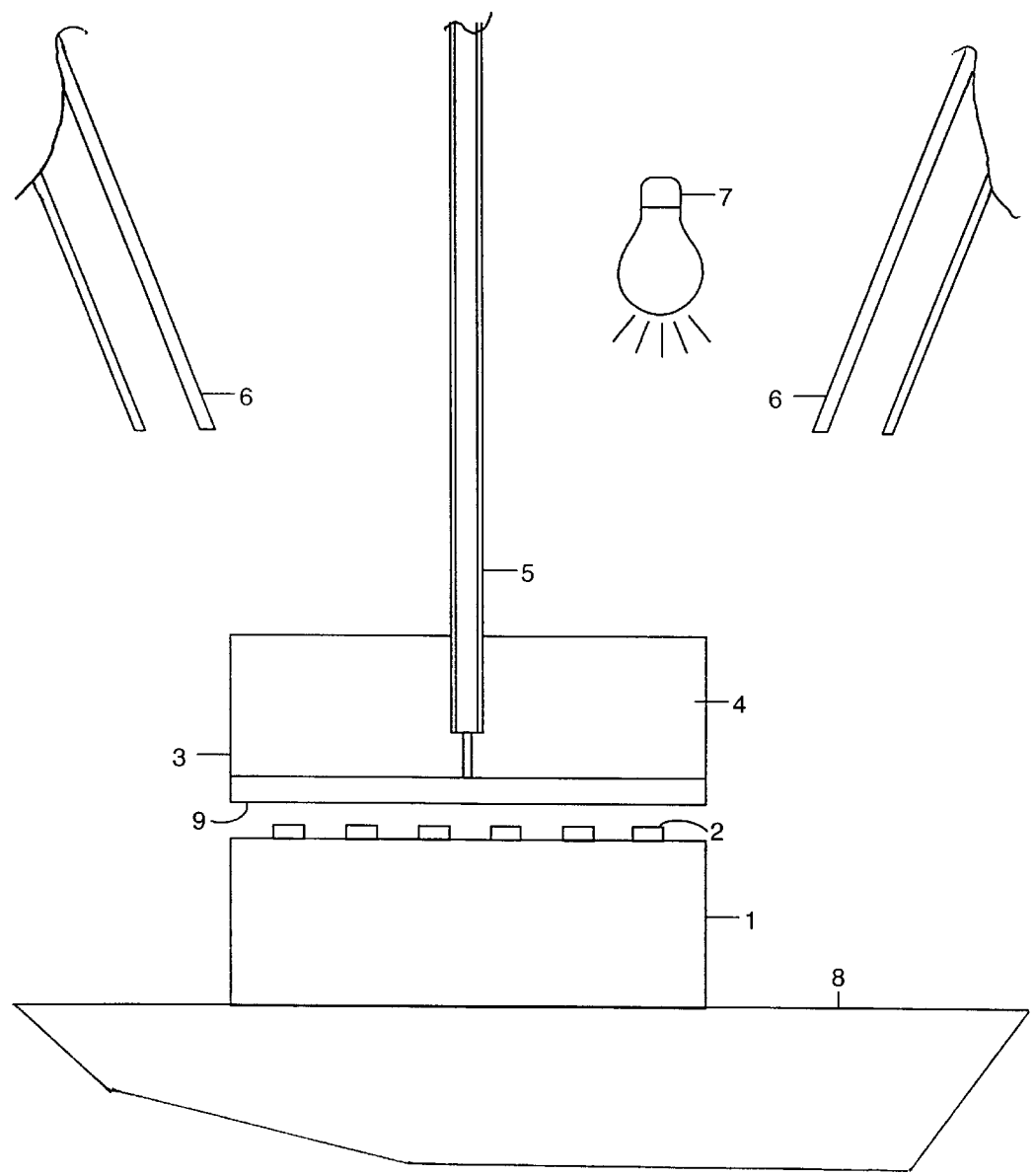
FIG. 1 illustrates a structure for removing solder from an article using a foil having micro-roughness, in accordance with one embodiment of the invention.

In FIG. 1 there is shown an article 1 with solder 2 at least a part of which it is desirable to remove. Article 1 may be any workpiece having solder whether such solder is normally or inadvertently applied by any process. One example of a workpiece is a circuitized substrate which may have an excess of solder applied to various bonding sites or pads or there may be an excess of solder remaining on bonding sites after removal of an electronic component that was previously soldered thereto. One example of a circuitized substrate is a printed circuit board having copper lines terminating in copper pads on a surface. Solder material on the pads may have a rough or uneven surface due to defects in the solder application process or because a component lead was de-soldered from the pad. Another example of a workpiece is a ball-grid-array chip carrier which has an irregular pattern of solder material or solder balls or solder columns attached to one surface which must be removed prior to re-use of the chip carrier. The workpiece may also be a semiconductor chip having solder bumps, solder balls, or solder columns which must be removed prior to re-use of the chip.

Article 1 is placed on support 8 which may be a metal plate preferably larger than the workpiece and preferably heated to a temperature of about 150° C. using hot gas, infra-red heat lamps, electrical resistance heating, or any other method known in the art. Support 8 may also include rails, pegs, or fixtures as needed to support a workpiece having an irregular back surface. If support 8 is heated, the workpiece rises in temperature to about 150° C. by thermal conduction from support 8 and therefore experiences less thermal shock from the solder removal operation than it might otherwise.

A metal foil 3 having a surface with micro-roughness 9 is attached to a rework head which can be a metal block 4. Metal foil 3 is preferably copper of 2 ounce per square foot or about 2.8 mili-inches in thickness and having length and width sufficient to cover an area of the workpiece requiring solder removal, such as the area of a component mounting site. The surface with micro-roughness 9 is preferably characterized by roughness parameters Ra of about 2.01 to 2.05 micro meters and Rz(DIN) of about 13.5 to 16 micro meters as explained below. Optionally, a solder flux such as Kester 244 no-clean flux manufactured by Kester Solder company of Des Plaines, Ill. may be applied to the surface having micro-roughness or to the workpiece, for improved wetting of the foil. Metal block 4 is preferably copper, plated with chromium of about 0.75 mili-inch thickness with length and width sized to accommodate the workpiece solder removal requirements as states above for the metal foil 3. One way of attaching the foil is by applying a vacuum suction through a hollow tube 5 inserted in an opening in the metal block 4. In operation, the foil 3 is positioned with its surface having micro-roughness 9 adjacent solder material 2. Heat is applied to the metal block 4 and foil 3 by any means, such as hot air directed through nozzles 6 and/or by an infrared heat lamp 7. Other heating means known in the art are also possible. The heat melts at least some of the solder material 2, allowing it to be drawn onto the surface 9 of foil 3. The foil 3 and metal block 4 are then withdrawn away from the article 1, for example by lifting hollow tube 5, metal block 4, and metal foil 3 together thereby removing at least some of the solder material 2.

Figure 2:
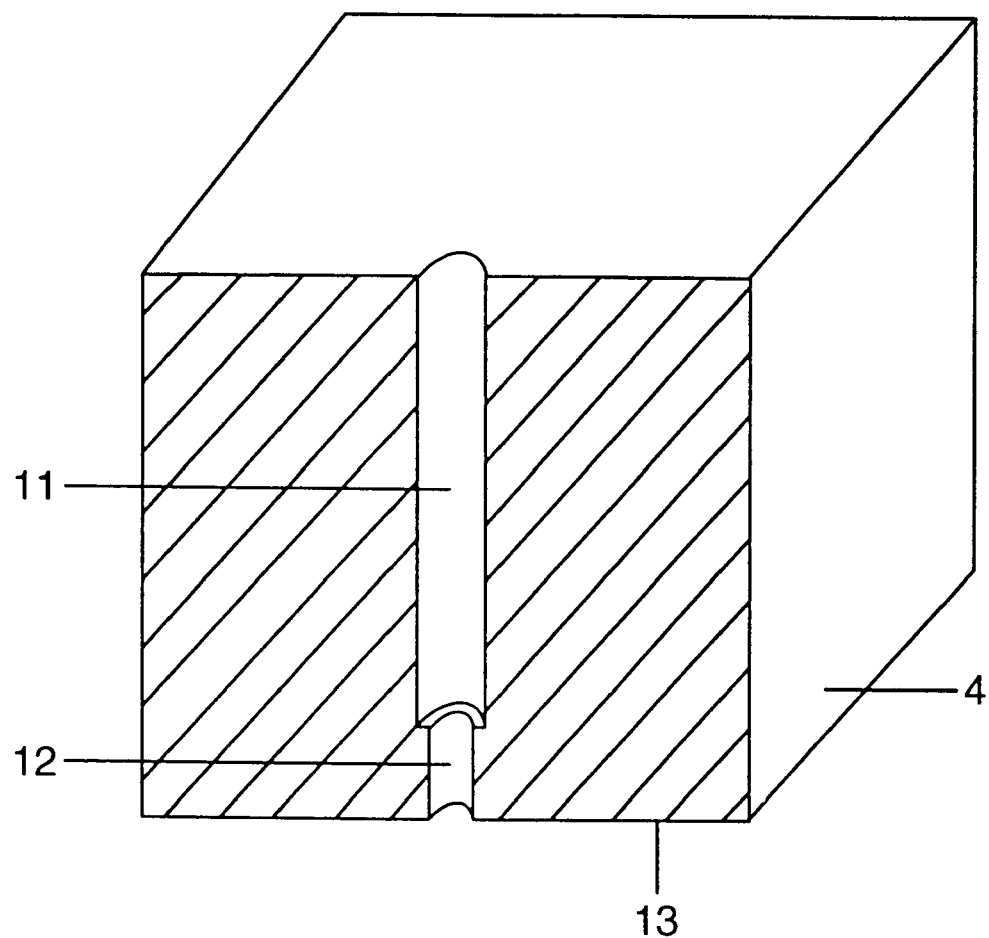
FIG. 2 shows a metal block of the invention and as seen in FIG. 1, with a cross section through an opening therein, for attaching to a vacuum source.

In FIG. 2, further detail of the metal block 4 is shown including a hole 11 for inserting the hollow tube 5 and a smaller diameter hole 12 passing through the block 4 to the bottom surface 13, which is preferably flat to hold the foil flat when the foil is attached to the block. The block is preferably made of solid copper which is preferably coated with a layer of protective metal to prevent oxidation of the copper. Chromium and titanium are well known materials which can be used for this protective layer. An aluminum block which does not require a coating can also be used. The layer must be thick enough to provide protection from oxidation and not wear off as foil material is repeatedly brought in contact with the block's bottom layer 13 but thin enough to not interfere with heat transfer between the solid copper block and metal foil. A layer of chromium less than 1 mili-inch thick on a block having the above thickness range has been found to provide acceptable operation in this embodiment of the invention.

Figure 3:
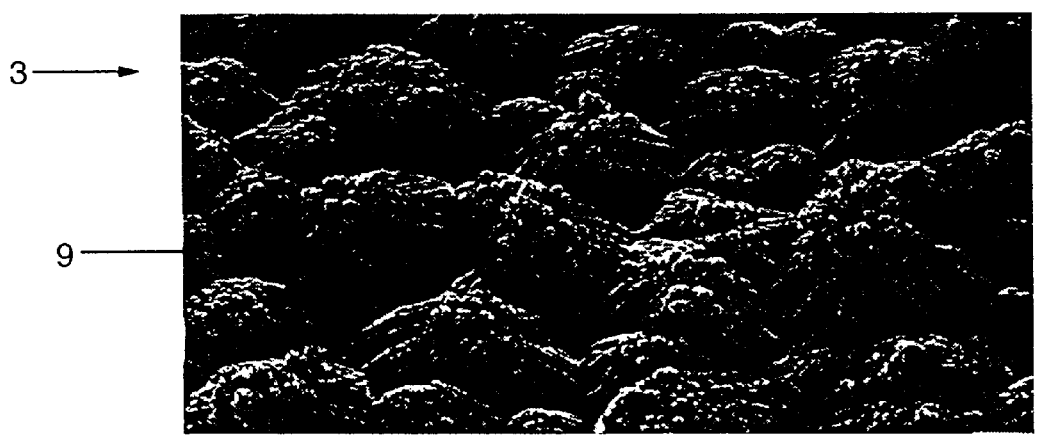
FIG. 3 is a scanning election microscope view at 1500× magnification of a copper foil surface in accordance with one embodiment of the invention, showing the features of micro-roughness.

In FIG. 3 there is shown a scanning election microscope view of a copper foil surface 9 having micro-roughness in accordance with one embodiment of the invention. A pattern of hills and valleys of copper material is clearly present. The roughness of a surface having micro-roughness is defined in the industry wide I.P.C. Specification ANSI/IPC-MF-150F available from the Institute for Interconnecting and Packaging Electronic Circuits, Lincolnwood, Ill. 60646-1705. Roughness parameter Ra is defined as the arithmetic average value of all absolute distances of the roughness profile from the center line within the measuring length. Rz(DIN) is defined as the average maximum peak to valley height of five consecutive sampling lengths within the measurement length.

Table 1 below shows the measured roughness parameters Ra and Rz(DIN) of three copper foil samples supplied by Oak-Mitsui, Inc., Hoosick Falls, N.Y. and Gould Electronics, Inc., Eastlake, Ohio. Similar data for a sintered copper block is also shown. It has been determined by actual solder removal tests that the 2 oz Oak Copper Foil is preferred to use to produce results comparable to those achieved with the sintered block.

Copper foils with micro-roughness are used in the printed circuit industry where the roughness is needed to provide adhesion to dielectric sheets during lamination processing. Accordingly, these are available at relatively low cost in large sheet format. Such large sizes can be cut into appropriate sizes corresponding to typical component site sizes for use in the present invention. After use, these can be discarded due to the extremely low cost thereof compared to sintered blocks or other solder removal methods. In this regard, the vacuum attachment capability of FIG. 1 allows for the removal and replacement of the foil to be readily performed either manually or with automated apparatus.

| MATERIAL | DIRECTION OF MEASURING | Ra($\mu$m) | RZ(DIN)($\mu$m) |
| --- | --- | --- | --- |
| Sintered Copper Block | X | 2.565 | 15.27 |
| | Y | 2.078 | 14.83 |
| 2 oz. Oak Copper Foil | X | 2.050 | 15.93 |
| | Y | 2.015 | 13.56 |
| 4 oz. Oak Double Treated Copper Foil | X | 0.624 | 7.390 |
| | Y | 0.492 | 3.761 |
| 5 oz. Gould Double Treated Copper Foil | X | 1.360 | 9.136 |
| | Y | 1.545 | 8.988 |

X = perpendicular to roll direction
Y = parallel to roll direction
Ra = average peak/valley height
Rz(DIN) = maximum peak-to-valley height One way of using the invention involves attaching a piece of copper foil of appropriate size, with a surface having micro-roughness as disclosed above to a metal block. This is accomplished by placing the foil surface opposite the surface having micro-roughness in contact with the metal block and applying a vacuum suction through the hole in the copper block thereby causing the foil to be held in place. Solderflux may be applied to the foil surface or the article. A thin layer of conformal material much as silicone rubber or TEFLON (a trademark of E. I. duPont deNemours and Company) of about 0.003 inch thickness can be placed between the metal block and the foil without interfering with heat transfer between the block and foil. Such a layer allows more even contact between the foil and the workpiece by allowing the foil to conform to any surface irregularities in the workpiece. The block has previously been attached to a rework head having a hollow tube as shown in FIG. 1. Heat is applied to the block using an infrared heat lamp or hot gas until the temperature of the block is above the melting temperature of the solder on the article. For example a temperature of 215–235° C. has been used to remove 63/37 tin/lead eutectic solder material. Solder balls of 5/95 tin/lead composition having a melting point of about 330° C. if fastened to the workpiece with eutectic solder can be removed with a foil temperature of 235–245° C. because the molten eutectic solder mixes with the material of the solder balls effectively reducing the required melting temperature. The foil, in contact with the block and thinner and less massive than the block, rapidly reaches essentially the same temperature. The foil is then positioned adjacent and in direct contact with the solder material by moving either the rework head or the article, and held in position briefly while continuing to apply heat to the block until the solder at least partially melts and flows onto the foil surface. Because the foil surface has micro-roughness, the quantity of solder which flows is much greater than would be expected or possible with a flat metal surface, filling the valleys disclosed above with molten solder. The foil is then withdrawn away from the article, taking the molten solder with it.

Thus, there has been shown and described a structure for removing solder from an article. A corresponding method of solder removal has also been shown and described. While these are at present considered the preferred embodiments of the invention, it will be obvious to these skilled in the art that various changes and modifications can be made therein without departing from the scope of the invention as defined by the appended claims.

What is claimed is:

1. A structure for removing solder material from an article, comprising:
   means for positioning a metal foil having a surface with micro-roughness adjacent solder material on an article; and
   means for heating said metal foil to a temperature sufficient to melt at least some of said solder material such that at least some of said solder material is drawn onto said surface having said micro-roughness.

2. The structure of claim 1 in which said metal foil is copper.

3. The structure of claim 1 in which said metal foil has a roughness parameter Rz of greater than about 10 micrometers.

4. The structure of claim 1 in which the thickness of said metal foil is about 2.8 mili-inches.

5. The structure of claim 1 in which said solder material comprises solder bumps, solder balls, solder columns, or a combination of thereof.

6. The structure of claim 1 in which said means for positioning said metal foil comprises a metal block.

7. The structure of claim 6 in which said metal block is copper.

8. The structure of claim 6 further including a non-solder-wettable metal material located on at least a portion of said surface of said metal block.

9. The structure of claim 8 in which said non-solder-wettable metal is chromium.

10. A process for removing solder material from an article, comprising the steps of:
    positioning a metal foil having a surface with micro-roughness adjacent solder material on an article;
    applying heat to said metal foil to substantially melt at least some of said solder material, allowing at least some of said solder material to be drawn onto said surface of said metal foil having said micro-roughness; and
    withdrawing said metal foil in a direction away from said article thereby removing some of said solder material from said article.

11. The process of claim 10, further comprising attaching said metal foil having a surface with micro-roughness to a rework head.

12. The process of claim 10 further comprising applying a flux to said solder material on said article.

13. The process of claim 10 further including the step of adding said solder material in the form of solder bumps, solder balls, solder columns, or a combination of these, to said article prior to said positioning of said metal foil adjacent said solder material.

14. The process of claim 10 in which said article is a substrate, a semiconductor chip, or an electronic component with a surface having at least one metal pad, solder material being in the form of a solder bump, solder ball, or solder column, attached to said pad.

15. The process of claim 10 in which said positioning of said metal foil having said surface with micro-roughness comprises positioning said foil having a surface with a roughness parameter Rz of greater than about 10 micrometers.

16. The process of claim 10, further comprising the step of attaching said metal foil to a metal block before positioning said metal foil adjacent said solder material.

17. The process of claim 16 in which the step of applying heat further comprises heating said metal block which in turn heats said metal foil by conduction from said metal block.

18. The process of claim 17 in which heat is applied with an infrared heat source.

19. The process of claim 16 in which said metal block is copper.

20. The process of claim 19 in which said metal block has a hole.

21. The process of claim 20 in which the step of attaching said metal foil comprises using a vacuum suction.

22. The process of claim 21 in which said vacuum suction is applied through said hole in said metal block.

* * * * *

UNITED STATES PATENT AND TRADEMARK OFFICE
CERTIFICATE OF CORRECTION

PATENT NO. : 5,909,838
DATED : 06/08/99
INVENTOR(S) : Lisa Jeanine Jimarez; Miguel Angel Jimarez It is certified that error appears in the above-indentified patent and that said Letters Patent is hereby corrected as shown below:

On the Cover page:

delete [76] and replace with --[75]--.

insert item --[73] Assignee: International Business Machines Corporation, Armonk, New York--

Signed and Sealed this

Eighteenth Day of January, 2000

Attest:

Q. TODD DICKINSON

*Attesting Officer*    *Commissioner of Patents and Trademarks*